(No Model.)
J. W. WOODHOUSE.
AXLE LUBRICATOR.
No. 478,832. Patented July 12, 1892.
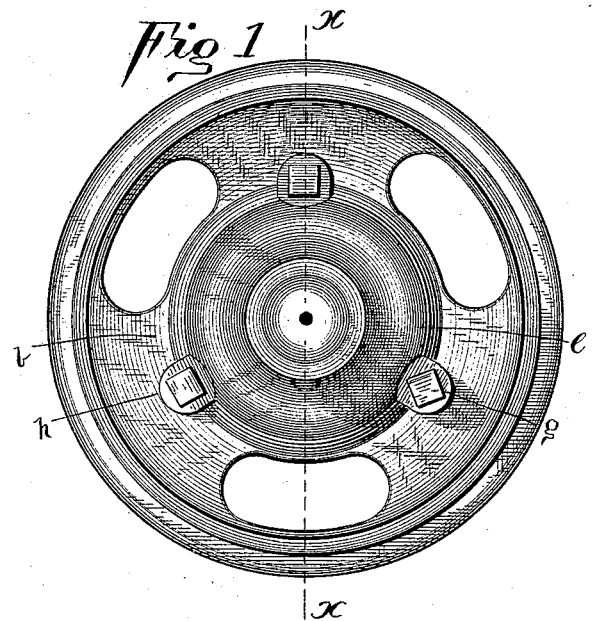
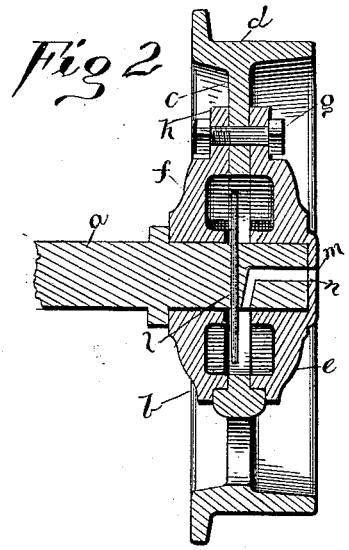
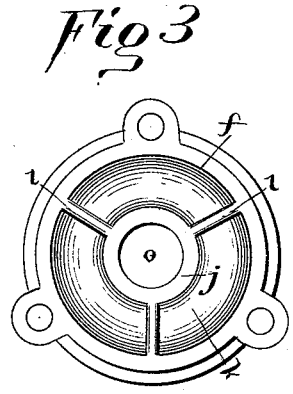
Witnesses
Inventor
John W. Woodhouse
his Attorney

UNITED STATES PATENT OFFICE.

JOHN WARREN WOODHOUSE, OF RICH HILL, MISSOURI.

AXLE-LUBRICATOR.

SPECIFICATION forming part of Letters Patent No. 478,832, dated July 12, 1892.

Application filed September 29, 1891. Serial No. 407,184. (No model.)

*To all whom it may concern:*

Be it known that I, JOHN WARREN WOODHOUSE, a citizen of the United States, residing at Rich Hill, in the county of Bates and State of Missouri, have invented certain new and useful Improvements in Car-Wheels; and I do hereby declare the following to be a full, clear, and exact description of the invention, such as will enable others skilled in the art to which it appertains to make and use the same.

My invention relates to that class of sectional car-wheels in which the hub portion is made detachable; and the object sought to be accomplished is to provide a wheel having a hollow hub divided into compartments adapted to receive oil applied through the end of the axle.

A still further object is to provide means for more perfectly diffusing and feeding the oil to the axle.

To this end my invention consists in the peculiar features and combinations of parts more fully described hereinafter, and pointed out in the claim.

In the accompanying drawings, Figure 1 represents a side elevation of my complete invention; Fig. 2, a transverse vertical section on line X X, Fig. 1; Fig. 3, a view of one of the caps.

The reference-letter $a$ represents an ordinary metallic axle, such as used on cars, &c., and $b$ a car-wheel. This wheel comprises a web $c$ and tire $d$, cast in one piece. The web $c$ is cut away at its center, and the opening thus formed is inclosed by two caps $e f$, placed on opposite sides of the web $c$, to which web they are rigidly fastened by bolts $g$, passing through ears or projecting lugs $h$. The caps $e f$ are provided with internal radial partitions $i$ and bosses $j$, which form three like recesses or oil-cavities $k$ and add strength to the wheel. A pin $l$ passes through the axle just inside of the cap $f$ and holds the wheel securely on the axle, the ends of the pin projecting into the recesses or oil-cavities $k$. In the center of the cap $e$ is an oil-hole $m$, which is directly opposite a similar hole $n$ in the end of the axle, which extends inwardly and then downwardly and empties into the recesses or oil-cavities $k$. Through these holes $m$ $n$ oil is supplied to the interior of the wheel, and hence lubricates the axle-bearing. The cap $f$ has a larger hole $o$ in its center, through which the axle $a$ passes.

In using my invention the operator first places the cap $f$ over the end of the axle and inserts the pin $l$. He then places the wheel against the cap $f$ and places the cap $e$ in position on the other side of the wheel and bolts them all together by means of the bolts $g$.

It is evident that my invention can be applied to pulleys and like devices, and that it could be varied in many slight ways that might suggest themselves to a skilled mechanic. Therefore I do not limit myself to the exact construction shown, but consider myself entitled to all such variations as come within the spirit and scope of my invention.

What I claim as new, and desire to secure by Letters Patent, is—

A car-wheel having an orifice, a pair of semi-spherical caps bolted on opposite sides of the wheel over the orifice in such a manner as to form an oil-chamber, an opening formed in one of the caps and extending entirely through the same, an axle fitting in the opening and projecting across the oil-chamber to the remaining cap, a recess formed in the inner side of the said cap, in which recess the free end of the axle is journaled, and means for holding the axle in place, substantially as described.

In testimony whereof I affix my signature in presence of two witnesses.

JOHN WARREN WOODHOUSE.

Witnesses:
J. S. CLARK,
J. A. WILSON.